Nov. 25, 1969 T. P. RUDY ET AL 3,480,488

SELF-REGULATING COATING PROCESS FOR PROPELLANT MATERIALS

Filed Aug. 1, 1966

INVENTORS,
THOMAS P. RUDY
TOSHIO W. NAKAGAWA
JOSEPH M. GREENDORFER

BY [signature]

ATTORNEY

United States Patent Office 3,480,488

Patented Nov. 25, 1969

3,480,488

SELF-REGULATING COATING PROCESS FOR PROPELLANT MATERIALS

Thomas P. Rudy, Saratoga, Toshio W. Nakagawa, San Jose, and Joseph M. Greendorfer, Redwood City, Calif., assignors to United Aircraft Corporation, East Hartford, Conn., a corporation of Delaware Filed Aug. 1, 1966, Ser. No. 569,172
Int. Cl. C06b *19/02*
U.S. Cl. 149—7 17 Claims

ABSTRACT OF THE DISCLOSURE

The coating of a substrate with a polymeric material of uniform and controllable thickness, which thickness is controlled by chemical rather than physical interactions is obtained by immersion of a substrate in a solution of the monomer of the polymer in an inert solvent, if the monomer, the solvent for the monomer, and the substrate are selected within the following guidelines:

(1) the substrate is selected from a material which is an initiator or co-reagent for polymerization of the monomer,
(2) the substrate material is essentially insoluble in the solvent for the monomer,
(3) the solvent is essentially inert with respect to both the monomer and the substrate,
(4) the substrate is capable of forming a solution with the monomer, and
(5) the fugacity of the monomer in solution with the substrate is less than the fugacity of the monomer in solution with the solvent.

Background of the invention

This invention relates to a process for controllably coating a substrate with a polymeric coating and more particularly to a process for encapsulating finely divided particles.

The process of this invention is applicable to coating processes generally wherein it is desired to coat a substrate with a polymeric coating having a uniform and controllable thickness. In particular this process is particularly useful in encapsulating finely divided particles with a uniform and controllable thickness of a polymeric material, and has great utility in the production of rocket propellants. In such propellant formulations, it is necessary to incorporate a finely divided oxidizer and various reactive materials into a polymeric binder and subsequently cure the binder into a tough rubbery polymer. In many desired systems the oxidizers undesirably react with the other components of the propellant or with the agents used to cure the system and it is necessary to encapsulate the oxidizer particles so that they cannot react with the other ingredients of the propellant formulations. It is particularly desirable that this encapsulating coating be as thin as possible and of uniform thickness around each particle. The presently employed processes, although capable of producing coatings on particles, are not capable of producing the degree of uniformity that is desired for this purpose, since they generally rely on physical processes, such as spraying or immersing the substrate in the coating material, for coating the particles. The process of this invention, however, provides a uniform polymeric coating on the particles and this coating can be accurately controlled by the proper selection of the process parameters as will be more fully explained below.

While this invention has particular utility in the preparation of coated oxidizer particles, the novel steps of this process can be employed in other and more diverse coating processes as will be obvious to a worker in the art from the description of this invention set forth below.

It is, accordingly, an object of this invention to provide a novel coating process for producing polymeric coatings of uniform and controllable thickness on a substrate.

It is another object of this invention to provide a process for encapsulating finely divided particles within a uniform polymeric shell of controllable thickness.

It is another object of this invention to provide a process for encapsulating finely divided particles of oxidizer within a uniform shell of controllable thickness of a polymeric material.

It is another object of this invention to provide an encapsulated oxidizer particle suitable for use in propellant compositions.

It is another object of this invention to provide a propellant composition containing an encapsulated oxidizer.

Description of the drawings

These and other objects of this invention will be readily apparent from the following description with reference to the accompanying drawings wherein.

Description of the invention

In its broadest aspect, this invention comprises the discovery that a substrate can be coated with a polymeric material by immersion in a solution of the monomer of the polymer and that the coating can be of uniform and controlled thickness, which thickness is controlled by chemical rather than physical interactions if the substrate, the monomer and the solvent for the monomer are selected within the following guidelines:

(1) The substrate is selected from a material which is an initiator or co-reagent for polymerization of the monomer, (2) The substrate material is essentially insoluble in the solvent for the monomer, (3) The solvent is essentially inert with respect to both the monomer and the substrate, (4) The substrate is capable of forming a solution with the monomer, and (5) The fugacity of the monomer in solution with the substrate is less than the fugacity of the monomer in solution with the solvent.

The term fugacity is a physical chemical term which defines the escaping tendency of one component of a heteric mixture. In effect, if the fugacity of the monomer in solution with the substrate is less than the fugacity of the monomer in solution with the solvent, the monomer will end to come out of solution with the solvent and into solution with the substrate. This is an essential requirement for an extraction process and, therefore, the substrate is capable of extracting the monomer from its solution in the solvent.

Figure 1:
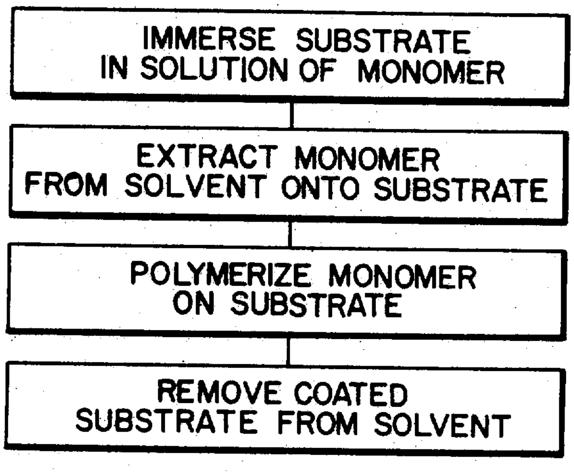
FIGURE 1 is a block diagram of the steps of the process of this invention.
Figure 2:
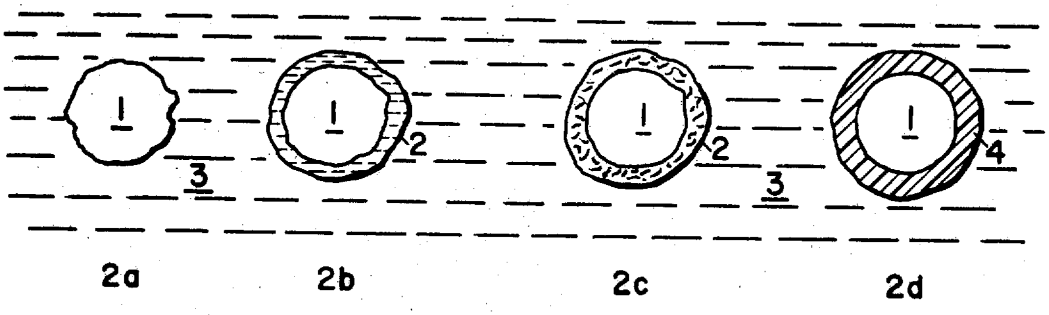
FIGURE 2 illustrates various views of an enlarged particle at various steps in the process of this invention.

If the monomer, solvent and substrate materials are selected within the guidelines set forth above, a novel coating process can be accomplished by following the steps illustrated in FIGURE 1. FIGURE 2 represents the condition of a particulate substrate 1 at various stages in this process. The substrate 1 upon immersion in a solution 3 of the monomer in the solvent is shown in FIGURE 2*a*. Upon immersion the substrate tends to extract the monomer from the solution in the solvent to form a thin liquid phase solution 2 of the substrate in the monomer around the entire surface of the substrate 1 as shown in FIGURE 2*b*. This extraction process tends to continue and the thickness of the liquid solution 2 of the monomer with the substrate 1 gradually tends to increase. Since the monomer and the substrate have been selected such that the substrate is either an initiator for polymerization of the monomer or a co-reactant for the polymerization of the monomer, the liquid phase layer tends to polymerize as shown in FIGURE 2*c* and ultimately forms a solid phase coating 4 as shown in FIGURE 2*d*. Polymerization reactions are sensitive to the temperatures employed and the polymerization rate can be increased or decreased by increasing or decreasing the temperature of the mixture. Since the effect of temperature on the extraction process of the monomer from the solution with the solvent is not as great as the effect of temperature on the polymerization rate, it is possible to accurately control the thickness of the final coating 4. Thus, the temperature can be adjusted so that the polymerization is completed after the desired amount of monomer has been extracted into solution with the substrate. Once the layer 2 polymerizes, the extraction process ceases and the encapsulated particles can be readily removed from the coating solution by filtration.

Figure 3:
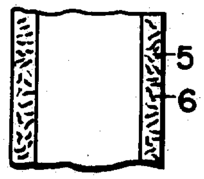
FIGURE 3 is a portion of rocket propellant containing an oxidizer coated according to the invention.

In one embodiment of this invention which will be described in greater detail below, the particles to be encapsulated are oxidizing agents usable in the production of solid rocket fuel or propellant grains. Such a grain is shown in FIGURE 3 and comprises a polymeric binder 5 having dispersed therethrough the encapsulated oxidizer particles shown generally as 6.

The obvious advantage of the coating process of this invention is that the thickness of the coating is controlled by physical chemical processes rather than by the random physical contacting processes of the prior art and thus the rates of the various processes can be more precisely controlled.

Since there are competing processes going on at the same time, a general guide as to the effect of the various operating parameters on the thickness of the coating will be useful to workers in the art. As a general rule, all other parameters remaining constant, the thickness of the coating increases with increased concentration of the monomer in the solvent. Also, the thickness increases with increased quantity of the monomer extracted into solution with the substrate, primarily a time dependent factor. The polymerization reaction is primarily temperature dependent; thus, when operating at low temperatures, the coating tends to be thicker than when operating at higher temperatures.

The specific temperatures, time, and concentration parameters employed in any specific process will depend to a large extent on the particular materials employed and on the thickness of the coating material desired. In general, however, the concentration of the monomer in solution is maintained from about 0.1 to 10% by weight and preferably from 0.5 to 3%. Satisfactory coating process can be carried out at temperatures ranging from 0° C. to 200° C., but due to practical considerations involving time and hazard factors, temperatures from ambient to about 150° C. are preferably employed. The time of reaction of course depends on the temperature employed and times have ranged from less than 3 minutes for high temperature systems to about 48 hours for low temperature systems.

A wide variety of substrates, monomers, and solvents may be utilized in the practice of this invention providing the components are selected in accordance with solubility and reactivity relationships described previously. For example, polar, electronegatively substituted vinyl monomers may be caused to form polymeric coatings on the surface of particles of solid, polar, anionic catalysts or free radical initiators by use of inert, non-polar solvents. Representative of such monomers are methyl acrylate, vinyl acetate and acrylonitrile. Suitable catalysts or initiators for these monomers are materials such as sodium cyanide, triphenylmethyl sodium and ammonium persulfate. Appropriate inert, non-polar solvents include such materials as paraffinic or naphthenic hydrocarbons and halocarbons. For electropositively substituted vinyl monomers, such as vinyl ethers, cationic polymerization catalysts such as the Lewis acids, aluminum chloride and silver perchlorate may be employed. The following additional combinations of monomer and catalytic or coreactive substrate illustrate the general applicability of the process.

TABLE I

| Monomer | Catalyst or Coreagent |
|---|---|
| Lactam | Alkali metal salt of lactam. |
| Polyol | Isocyanate. |
| Epoxide | Acid anhydride, alkali metal iodide, polyamine, alkali metal alkoxide, Lewis acid. |
| Aziridine | Inorganic oxidizing agents, Lewis acid. |

Use of a non-polar solvent in conjunction with a polar monomer and a polar substrate provides the most generally applicable system. However, it is possible to employ a combination of polar solvent with non-polar monomer and substrate. Versatility of the latter system is restricted by the limited selection of solvents which are both sufficiently polar and chemically inert with respect to both monomer and substrate.

The present invention is particularly useful for encapsulation of solid, inorganic oxidizing agents by use of mono- and polyfunctional aziridinyl monomers. Due to the polar nature of the oxidizing agents, a polar monomer and a non-polar solvent are required. The precise mechanism by which the oxidizers catalyze the polymerization of extracted aziridinyl monomers is not known. In the case of ammonium perchlorate, it might be argued that the substrate is exhibiting the expected catalytic activity of a Lewis acid. This, however, does not appear to be the case, since comparable, but non-oxidizing Lewis acids such as ammonium chloride, ammonium sulfate, and sodium bisulfate fail to catalyze polymerization under the usual experimental conditions. Furthermore, other oxidizers such as the perchlorates and nitrates of lithium and sodium, which possess little or no Lewis acid character, are found to be effective catalysts.

The following examples demonstrate both the physicochemical mechanism of this invention as well as the means by which the amount and properties of the coating may be controlled. Unless otherwise indicated, the monomer is tris(2-methylaziridinyl)phosphine oxide (MAPO), and the solid, catalytic substrate is ammonium perchlorate of 300 micron average particle size. A saturated hydrocarbon solvent is employed; either n-hexadecane or a petroleum spray base (hydrogenated, sulfuric acid-extracted, straight run distillate of boiling range 185°–200° C.) may be used interchangeably.

Effect of temperature

*Example 1.*—Twenty parts by weight of a saturated solution of the monomer in the solvent is placed in contact with one part of the substrate at 25° C. and the mixture is stirred occasionally for 30 minutes. The supernatant solution is decanted, and the residue is examined microscopically. The residue is observed to consist of ammonium perchlorate particles coated with, and agglomerated by, a liquid phase which is insoluble in the hydrocarbon solvent but soluble in water. This liquid phase may be isolated for study by filtration. If the liquid phase is heated overnight at 50° C. or for 5 minutes at 100° C., it is cured to a tough resin which melts over the range 200°–220° C. An essentially identical curable liquid may be prepared by dissolving one part by weight of finely divided ammonium perchlorate in four parts of undiluted monomer. The latter experiment should be performed only on a sub-gram scale and with caution since the catalytic homopolymerization of the monomer during the curing process is highly exothermic. If provision is not made to dissipate heat, a runaway reaction leading to ignition may occur.

*Example 2.*—When the aforementioned experiment involving the same composition of solvent, monomer and substrate is conducted at higher temperatures, the following results are obtained. At 70° C., agglomeration of the substrate still occurs, but after 30 minutes, all particles of the substrate are coated with a soft, water-insoluble coating. At 80° C., less agglomeration occurs, and a comparable coating is formed in 20 minutes. At 100° C., no agglomeration occurs, and a tough coating is formed in 10 minutes. At 145° C., a thin, tough, somewhat granular coating forms within 3 minutes.

Since the coatings are permeable to water, they may be freed of ammonium perchlorate by exhaustive leaching of the coated particles with water. Microscopic examination of the isolated coatings reveals them to be approximately spherical shells of extremely uniform thickness. After collection by filtration, further washing with water and drying, the coatings are weighed. Using this gravimetric technique, the effect of process variable on weight percentage of coating can be determined.

The effect of temperature on the thickness of coating is illustrated by the following experiments.

*Example 3.*—Using equal parts by weight of substrate and a solution containing 3.5% by weight of monomer, the coating process is conducted for 10 minutes at 75° C. followed by 20 minutes at 95° C. A coating comprising 1.6% by weight of the product is obtained. When the process is conducted for 30 minutes at 95° C., the coating comprises 0.97% by weight. At the low initial temperature of the former experiment, the extraction process proceeds to a greater extent than in the latter experiment before extraction is terminated by polymerization of the liquid phase.

Effect of time reaction

*Example 4.*—During the extraction phase of the coating process, time of reaction is an important parameter. When the substrate is exposed to a solution of 1.4% by weight monomer for 25 minutes at 25° C., then for 5 minutes at 100° C., a cured coating and agglomeration result. If, however, the exposure is limited to 10 minutes at 25° C., followed by 5 minutes at 100° C., a thinner cured coating and no agglomeration result.

Once a completely cured coating is obtained, further exposure of the substrate to the coating solution is essentially without effect. For example, if the substrate is exposed for 2 hours at 110° C. to a solution of 3.5% by weight of monomer, a cured coating of 1.41% by weight is obtained. If the thus coated substrate is again treated under the same conditions for an additional 6.5 hours, the amount of coating is found to be unchanged.

Effect of concentration of monomer

The rate of the extraction phase of the coating process is understandably dependent on the concentration of monomer in the coating solution. This provides an additional means of controlling the thickness of coating as illustrated by the following experiments conducted at 100° C. for 15 minutes.

*Example 5.*—With concentrations of monomer of 3.0, 3.5, and 4.7% by weight of the coating solution the weight percentages of coating on the substrate are 0.44, 0.97, and 1.90, respectively. It should be noted that these coatings may be regarded as cured from the standpoint of integrity and most mechanical properties. However, under continued heating, further crosslinking reactions will decrease the concentration of water-soluble constituents and thereby lead to apparent increases in percent weight of coating.

Effect of particle size of substrate

Since the extraction phase of the coating process occurs at the interface of the solid substrate and the solution of monomer, the rate of extraction is dependent on the surface area of the substrate. Hence, the percentage by weight of coating increases with decreasing particle size. For example, under comparable processing conditions, the coatings formed on substrate of 300, 20, and 5 micron average particle diameter are found to be 0.35, 1.75, and 3.0% by weight respectively.

Specific applications of the coating process to other monomers and substrates

*Example 6.*—A saturated solution of tris(1-aziridinyl) phosphine oxide (APO) in petroleum spray base is prepared at 80° C. To 10 ml. of this solution is added 2 gm. of ammonium perchlorate of 300 micron average particle diameter. The mixture is stirred occasionally for 30 minutes and then cooled to room temperature. The coated oxidizer is collected by filtration, washed with petroleum ether and dried under vacuum. Presence of a uniform polymeric coating is revealed by water leaching and microscopic inspection as described previously.

Similar results are obtained at temperatures below 76° C. using 1 to 3% by weight solutions in carbon tetrachloride of the following monomers: nitrilotriethyl-β-propyleniminobutyrate, nitrilotriethyl - β - ethyleniminobutyrate, tris(2-ethylaziridinyl)-s-triazine, tris(2-methylaziridinyl)-s-triazine, bis(2-methylaziridinylethyl)sulfone, and 2,2,4,4,6,6 - hexakis(2 - methylaziridinyl)-2,4,6-triphospha-1,3,5-triazine. These monomers in carbon tetrachloride solution are particularly suitable for use with oxidizing agents more reactive than ammonium perchlorate.

*Example 7.*—The oxidizers, ammonium nitrate and lithium perchlorate, are coated according to this invention by treatment for 30 minutes at 150° C. with 100 parts by weight of a solution containing 1% by weight of MAPO in petroleum spray base.

*Example 8.*—A polymerized epoxide coating is applied to ammonium perchlorate by treatment of the latter for 16 hours at 70° C. with 400 parts by weight of a spray base solution containing 1% by weight of the triglycidyl ester of oleic acid trimer.

*Example 9.*—An essentially nonoxidizing substrate, potassium iodide, is coated with polymerized epoxide by treatment for one hour at 100° C. with 100 parts by weight of a spray base solution containing 0.25% by weight of 2,6-bis(2,3-epoxypropyl)phenyl glycidyl ether.

Inclusion of nonpolymerizable materials in the coating

It is sometimes desirable to incorporate nonpolymerizable materials into the coating on the substrate. For example, solid materials such as carbon black and iron oxide which modify propellant burning rates can be incorporated in the polymeric coatings of this invention by the simple expedient of dusting the oxidizer substrate to be coated with finely divided carbon black or iron oxide. Of greater utility, however, is a modification of the coating process in which the desired nonpolymerizable materials are selected to be preferentially soluble in the coating prior to the polymerization step. Thus, the additive is first dissolved in the treating solution and, during formation of the still liquid coating, is concentrated therein.

Combustion accelerators such as ferric acetylacetonate and ferric 2-ethylhexanoate are representative of additives which may be selectively incorporated in a polar coating of the invention.

*Example 10.*—A petroleum spray base solution is prepared containing 3.5% by weight of MAPO and 0.24% by weight of iron in the form of ferric 2-ethylhexanoate. This solution is used to coat ammonium perchlorate of 300 micron average particle diameter in the previously described manner. Two parts by weight of coating solution are employed per part of oxidizer, and the process is conducted for 40 minutes at 100° C. Gravimetric and chemical analyses of the product show a coating of 1.85% by weight and an iron content of 0.095% by weight. The activity of the included catalyst in promoting thermal decomposition of the coated oxidizer is demonstrated by differential thermal analysis at a heating rate of 5° C. per minute. The first exotherm exhibited by uncoated ammonium perchlorate begins at approximately 320° C. Presence of the combustible, polymerized MAPO coating without included catalyst depresses this temperature to 306° C. Inclusion of ferric 2-ethylhexanoate in the coating as described alone depresses the exotherm onset temperature to 271° C.

Properties of coated ammonium perchlorate

The presence of a polymerized coating of MAPO on particulate ammonium perchlorate alters several properties of the oxidizer. Impact sensitivity of the oxidizer is increased only slightly by the presence of 0.3% by weight coating on ammonium perchlorate of 300 micron average particle diameter. Average impact sensitivities as determined using a modified Olin-Mathieson drop weight tester are: uncoated oxidizer, 97 kg. cm., coated oxidizer, 86 kg. cm. Furthermore, the coated oxidizer does not sustain combustion at atmospheric pressure. Thus, the coated oxidizer may be handled without special precautions.

The presence of the polymerized coating renders the surface of the oxidizer particles less hygroscopic. Therefore, the coated particulate oxidizer flows more freely and does not cake or agglomerate on exposure to atmospheric moisture. Furthermore, the resilient coating minimizes attrition of the oxidizer during processing and essentially eliminates the formation of hazardous dust.

Properties of propellants containing coated oxidizer

The following examples illustrate the utility in composite solid rocket propellants of oxidizer coated by the present invention. In general, the observed benefits stem from the physical isolation of the oxidizer particles from each other or from other ingredients of the propellant.

*Example 11.*—A series of propellants are prepared using the following formulation.

| Ingredient: | Percent by weight |
|---|---|
| Carboxy-terminated polyester of neopentyl and azelaic acid, equiv. wt. 900 | 11.0 |
| Tris(2 - methylaziridinyl)phosphine oxide (MAPO) equiv. wt. 75 | 1.5 |
| Trimethylolethane trinitrate | 12.5 |
| Aluminum, 40 micron | 24.0 |
| Ammonium perchlorate, 400 micron | 51.0 |

When ammonium perchlorate coated according to the present invention with 0.75% by weight of polymerized MAPO is substituted for uncoated material, the impact sensitivity of the uncured propellant is markedly decreased: uncoated, 25 kg. cm.; coated, 39 kg. cm.

In certain propellant formulations, desirable increases in burning rate may be achieved by use of oxidizer coated according to the present invention. The following formulation is illustrative.

*Example 12*

| Ingredient: | Percent by weight |
|---|---|
| Carboxy-terminated polybutadiene (Thiokol HC–434, equiv. wt. 1951) | 17.41 |
| 2,6-bis(2,3-epoxypropyl)phenyl glycidyl ether (equiv. wt. 105) | 0.85 |
| ERL–2258 (an epoxide of undisclosed composition produced by Union Carbide Corp., equiv. wt. 134) | 0.35 |
| 2-butoxyethyl pelargonate | 3.35 |
| Chromium 2-ethylhexanoate | 0.04 |
| Ammonium perchlorate: | |
| 190 micron, ave. | 68.00 |
| 7 micron, ave. | 10.00 |

The propellant is cast in the form of internal burning, case-bonded grains weighing approximately 31 grams each, and the grains are fired in a rocket micromotor at average chamber pressures in the range 200–1800 p.s.i.a. With uncoated ammonium perchlorate, the burning rate ($r_b$) of the propellant in inches per second is described by the equation:

$$r_b=0.315\ (Pc/1000)^{0.354}$$

where $Pc$ is the average chamber pressure in p.s.i.a.

When the 190 micron ammonium perchlorate is coated according to the present invention with 1.2% by weight of polymerized MAPO, the burning rate is increased according to the equation:

$$r_b=0.45\ (Pc/1000)^{0.347}$$

The coatings of the present invention can be employed to suppress undesired interference by the oxidizer with the reaction required for crosslinking (curing) of the binder. The following experiments are illustrative.

*Example 13.*—A binder formulation is prepared using carboxy-terminated polyisobutylene of 1000 equivalent weight with 2, 6-bis(2,3 - epoxypropyl)phenyl glycidyl ether at a carboxyl/oxirane ratio of 1.0. Addition of 1.0% by weight of dimethylaniline or cetyldimethyl benzylammonium chloride catalyzes the crosslinking reaction so that a strong, rubbery composition is formed in less than three days at 70° C. Addition to the uncured catalyzed formulations of 50% by weight of 300 micron, uncoated ammonium perchlorate inhibits the cure reaction in such a manner that the compositions merely thicken under the described curing conditions. However, when ammonium perchlorate coated according to the present invention with 0.75% by weight of polymerized MAPO is employed in an otherwise identical experiment, the compositions cure at essentially the same rate as the formulations containing no oxidizer.

This invention has been described with respect to several specific examples, but it is recognized that these examples are merely illustrative and are not to be considered as limiting of the invention. For example, while the substrate to be coated has been described previously as a particle, it is readily apparent that this coating process can be employed with substrates in any form such as, for example, sheet, coil, polyhedral or complex form. In addition, the substrate to be coated can itself be a coating on another substrate. For example, a thin coating of a polymerization initiator or coreagent could be applied to a metallic or other substrate and treated according to this invention to provide a polymeric coating on the metallic or other surface.

Since this invention has utility with many materials under varying conditions, many modifications and substitutions can be made without departing from the scope of this invention which is limited only by the following claims.

We claim:

1. A process for coating a substrate with a polymeric material by immersion in a solution of a polymerizable material, capable of polymerizing to form said polymeric material, in a solvent inert with respect to said polymerizable material and said substrate, said substrate being selected from the group consisting of polymerization initiators and polymerization co-reagents for said polymerizable material, said polymerizable material being more soluble in said substrate than in said solvent, and said substrate being substantially insoluble in said solvent, comprising the steps of:

(a) contacting said substrate with said solution, (b) extracting said polymerizable material from said solvent into solution with said substrate, and (c) polymerizing said polymerizable material in situ.

2. The process of claim 1 further comprising the step of removing the coated substrate from said solution.

3. The process of claim 1 wherein said substrate is in particulate form whereby particles encapsulated by a polymeric material are produced.

4. The process of claim 1 wherein said substrate is in the form of a coating on another substrate.

5. The process of claim 1 wherein said substrate and said polymerizable material are polar materials and said solvent is non-polar.

6. The process of claim 1 wherein said substrate and said polymerizable material are non-polar and said solvent is polar.

7. A process for producing a coating of a polymer on a substrate comprising the steps of:

(a) dissolving a polymerizable material in a solvent inert with respect to said substrate and said polymerizable material, said substrate being substantially insoluble in said solvent, said polymerizable material being capable of polymerizing to said polymer upon contact with said substrate and being capable of forming a solution with said substrate, the fugacity of said polymerizable material in solution with said substrate being less than the fugacity of said polymerizable material in solution with said solvent, and (b) contacting said substrate with said dissolved polymerizable material whereby said polymerizable material is extracted into solution with said substrate and forms a polymeric coating on said substrate.

8. The process of claim 7 further comprising the step of removing the coated substrate from said dissolved polymerizable material.

9. The process of claim 7 further comprising the steps of controlling the temperature and time of said contact whereby the thickness of said polymeric coating is controlled.

10. The process of claim 7 wherein said substrate and said polymerizable material are polar and said solvent is non-polar.

11. The process of claim 7 wherein said substrate and said polymerizable material are non-polar and said solvent is polar.

12. A process for encapsulating solid particulate inorganic oxidizing agents selected from the group consisting of perchlorates and nitrates with aziridinyl polymer which comprises:

(a) forming a solution of the monomer of said polymer in a non-polar solvent, (b) contacting said oxidizing agent with said solution, and (c) removing said particles from said solution when polymerization of said monomer on said particle is complete.

13. The process of claim 13 wherein a combustion modifier is incorporated in said solution of said monomer and said non-polar solvent.

14. The process of claim 13 wherein said combustion modifier is an organic iron compound.

15. A process for encapsulating a particulate inorganic oxidizing agent selected from the group consisting of perchlorates and nitrates with an aziridinyl polymer which comprises:

(a) forming a solution of the monomer of said polymer in a non-polar solvent said solution having from 0.1–10% by weight of said monomer, (b) immersing said particulate oxidizer in said solution, (c) maintaining the solution within a temperature range of 0° C. to 200° C. for up to 48 hours, and (d) removing the coated oxidizer particles from said solution.

16. The process of claim 15 wherein said temperature range is from ambient to about 150° C. and said concentration is from 0.5–3.0%.

17. The process of claim 15 wherein a combustion modifier is incorporated in said solution.

No references cited.

BENJAMIN R. PADGETT, Primary Examiner

U.S. Cl. X.R.

117—100; 149—4, 5, 6, 19